United States Patent
Qi (10) Patent No.: US 7,847,801 B2
(45) Date of Patent: Dec. 7, 2010

(54) METHOD FOR REPORTING REDUNDANT CONTROLLERS AS INDEPENDENT STORAGE ENTITIES

(75) Inventor: Yanling Qi, Austin, TX (US)

(73) Assignee: LSI Corporation, Milpitas, CA (US)

( * ) Notice: Subject to any disclaimer, the term of this patent is extended or adjusted under 35 U.S.C. 154(b) by 963 days.

(21) Appl. No.: 11/540,468

(22) Filed: Sep. 29, 2006

(65) Prior Publication Data

US 2008/0086618 A1    Apr. 10, 2008

(51) Int. Cl.
*G06F 13/14* (2006.01)
*G06F 13/00* (2006.01)
*G09G 5/39* (2006.01)

(52) U.S. Cl. .................. 345/520; 345/531; 345/532; 345/536; 345/537

(58) Field of Classification Search .............. 345/520, 345/544, 531, 532, 536, 537; 711/170, 173
See application file for complete search history.

(56) References Cited

U.S. PATENT DOCUMENTS

| | | | |
|---|---|---|---|
| 5,790,775 A * | 8/1998 | Marks et al. | 714/9 |
| 6,763,455 B2 * | 7/2004 | Hall | 713/1 |
| 7,328,324 B2 * | 2/2008 | Wang et al. | 711/173 |

* cited by examiner

*Primary Examiner*—Hau H Nguyen
(74) *Attorney, Agent, or Firm*—Yee & Associates, P.C.

(57) ABSTRACT

A computer implemented method, apparatus, and computer usable program code are provided for managing dual active controllers in a high availability storage configuration. Redundant dual active controllers in high availability storage configurations are made to appear as individual storage target devices to a host system. Each controller owns certain volumes of data storage. When a host system sends a request to identify available data volumes, the controller that owns certain volumes provides preferred paths to those owned volumes. The host system may also send an inquiry to a controller that asks the controller about data volumes not owned by the controller. For such inquiries, no paths to the non-owned data volumes are returned to the host system.

20 Claims, 7 Drawing Sheets

METHOD FOR REPORTING REDUNDANT CONTROLLERS AS INDEPENDENT STORAGE ENTITIES

BACKGROUND OF THE INVENTION

1. Technical Field

The present invention is directed generally toward a method and apparatus for a data processing system. More specifically, the present invention relates to a computer implemented method, computer program product and data processing system for a storage array with a redundant dual active controller array to appear as two independent storage targets.

2. Description of the Related Art

Currently, when computer applications require high input/output (I/O) data transfer rates between a host system and data storage devices, usually, high performance redundant dual controller storage arrays are used as data storage devices for those applications. The host system will install multiple host bus adapters (HBAs), which are small computer system interface (SCSI) initiators that connect to storage array systems with multiple target ports. A host bus adapter could be a Fiber Channel (FC), InfiniBand (IB), Serial Attached SCSI (SAS), Internet small computer systems interface (iSCSI), Parallel SCSI Interface (SPI) or other transport protocol host bus adapter (HBA) that provides transport connections for small computer system interface (SCSI) protocol. A host bus adapter provides input/output (I/O) processing and physical connectivity between a server and storage devices. As the only part of a storage area network that resides in a server, host bus adapters (HBAs) also provide a critical link between the storage area network and the operating system (OS) and application software. A small computer system interface (SCSI) initiator is a device that begins a small computer system interface (SCSI) transaction by issuing a command to another device, referred to as the small computer system interface (SCSI) target or simply as the target, giving the target a task to perform. Typically, a small computer system interface (SCSI) host adapter is the initiator but targets may also become initiators. In such a hardware configuration, the host can have multiple data paths to a data volume in the storage array. Data paths are combinations of host initiator ports and storage array target ports. The set of data paths to the storage array usually will be grouped as two groups. Each group of data paths corresponds to a set of data paths to a specific storage controller in the redundant dual active controllers.

Thus, the host will see all data paths to the various data volumes through each of the redundant dual active controllers, even though each of the redundant dual active controllers only controls a subset of the total number of data paths. As the host systems will see all the paths as viable through each of the redundant dual active controllers, commands may be sent to store or retrieve information to a controller that does not actually have access to the data volume, thus causing errors and delays.

SUMMARY OF THE INVENTION

The illustrative embodiments provide a computer implemented method, apparatus, and computer usable program code for managing dual active controllers in a high availability storage configuration. A request is received from a host. In response to receiving the request, an owned logical unit is identified for each controller of the dual active controller. Upon determining the owned logical unit for each controller of the dual active controller, a logical unit number only of the owned logical unit is returned for each controller.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention; the practical application to enable others of ordinary skill in the art to understand the invention for various embodiments with various modifications as are suited to the particular use contemplated.

Figure 1:
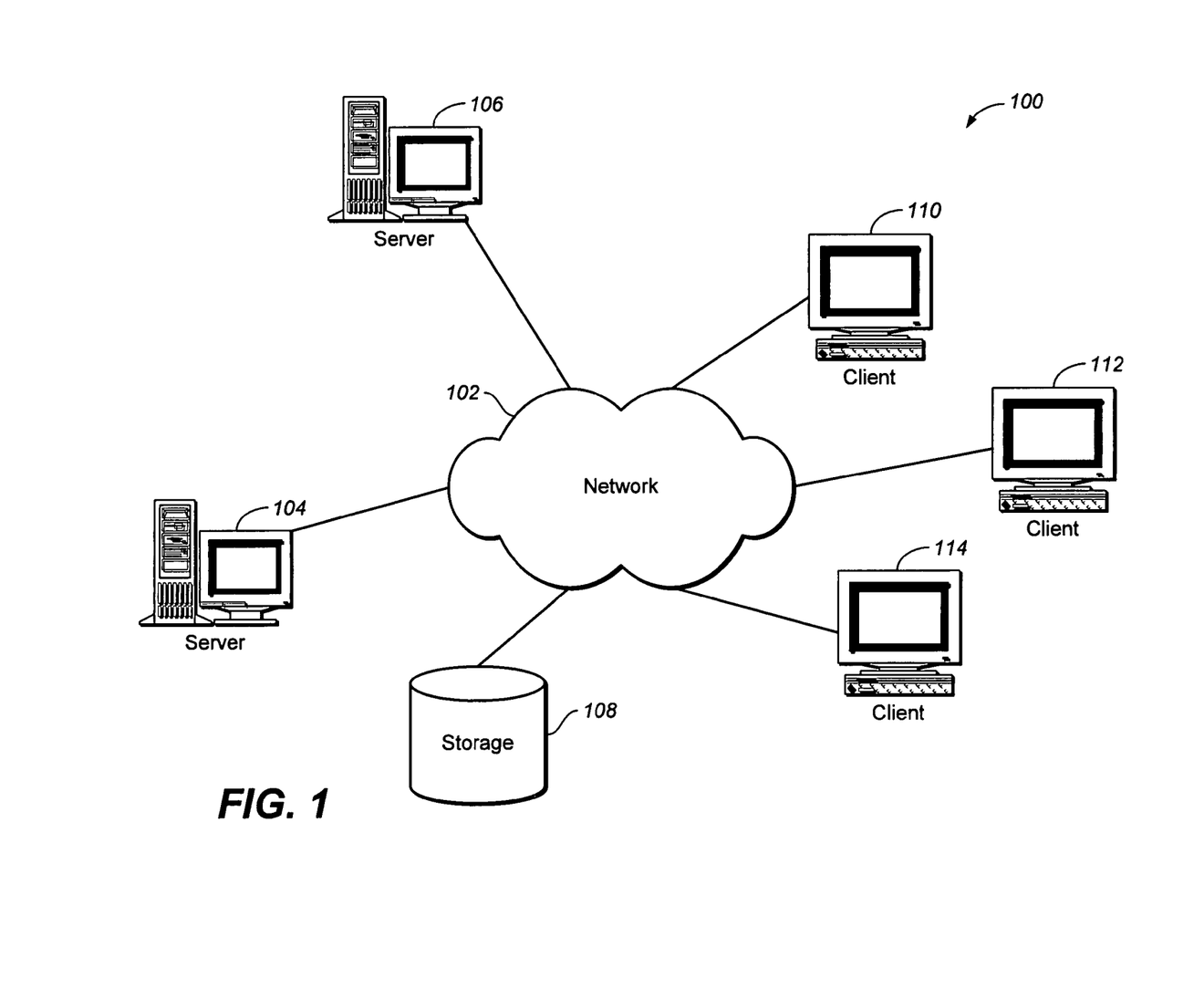
FIG. 1 is a pictorial representation of a network of data processing systems in which exemplary aspects may be implemented.
Figure 2:
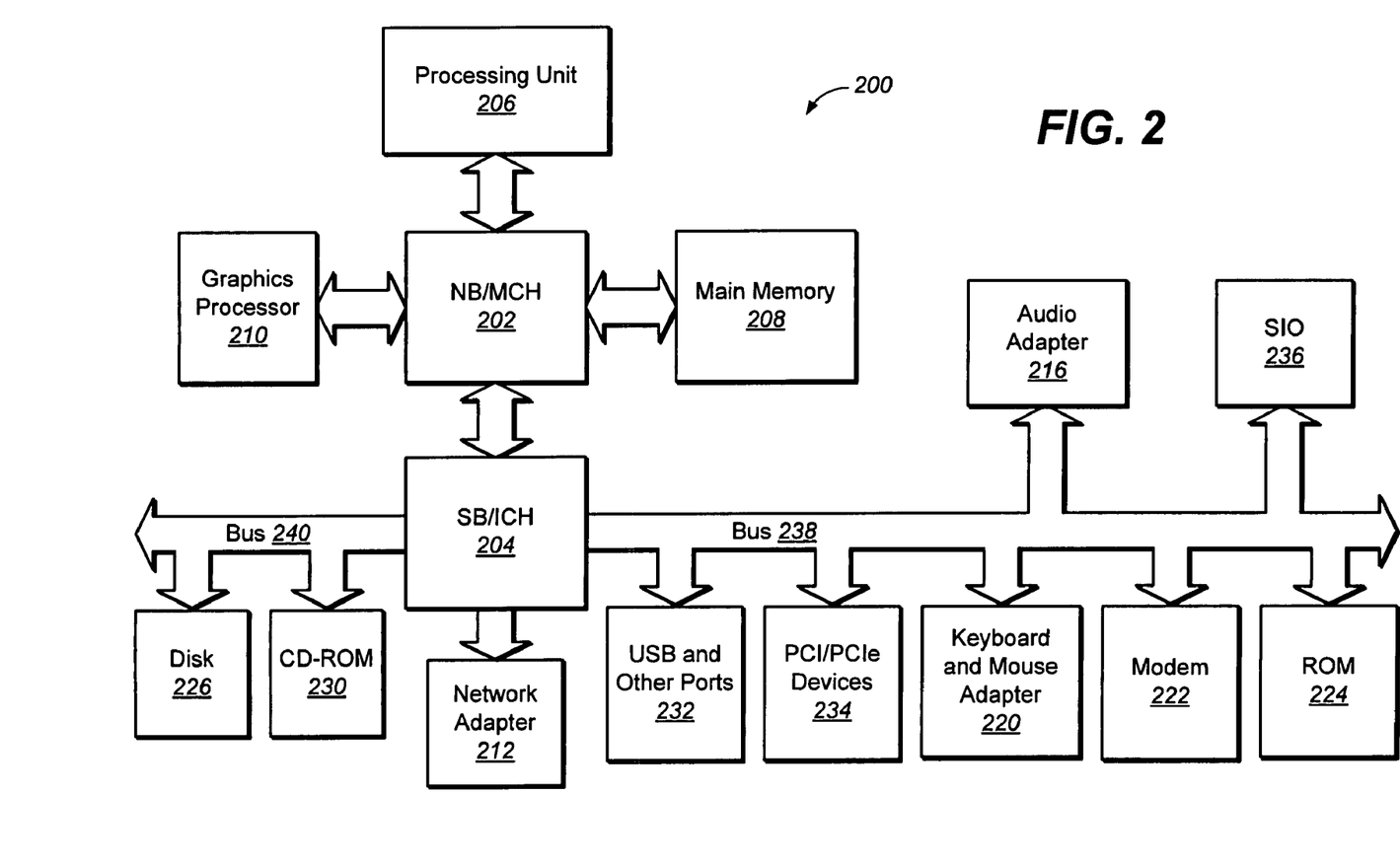
FIG. 2 is a block diagram of a data processing system in which exemplary aspects may be implemented.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which exemplary embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system (OS) images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash basic input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system (OS) runs on processing unit 206 and coordinates and provides control of various components within data processing system 200 in FIG. 2. As a client, the operating system (OS) may be a commercially available operating system (OS) such as Microsoft® Windows® XP (Microsoft and Windows are trademarks of Microsoft Corporation in the United States, other countries, or both). An object-oriented programming system, such as the Java programming system, may run in conjunction with the operating system (OS) and provide calls to the operating system (OS) from Java programs or applications executing on data processing system 200.

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system (OS), the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system (OS) files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

An exemplary embodiment provides for a redundant dual active controllers that will appear to the host systems as two independent storage targets. Each storage entity will manage host I/O requests to a set of volumes in the storage array. The host system will only realize the existence of the data paths from the preferred controller of a data volume. At a given time, a data volume is "owned" by a specific controller. Host I/O requests to the same data volume through an alternate controller cause a significant I/O performance penalty.

In an exemplary embodiment, a host system will see data paths of a data volume only from the preferred controller of the data volume. The redundant dual active controllers become two individual storage target devices to a host system. An exemplary embodiment provides that an operating system's (OS) built-in multiple-path solution may freely distribute I/O requests to all available data paths of a data volume without causing I/O performance penalties since only optimized data paths are available to an operating system (OS). Optimized data paths are data paths from a preferred controller of a data volume.

During the host operation system small computer system interface (SCSI) device discovery time, small computer system interface (SCSI) command "inquiry" and "report luns" are used to find the existence and device characteristics of logical units in a given small computer system interface (SCSI) target device. In these examples, a logical unit is a data storage device. A LUN is an abbreviation for logical unit number. A logical unit number (LUN) is an identifier for a logical unit. Luns is a list of the logical unit numbers. The small computer system interface (SCSI) 3 standard introduces the "report luns" command. An operating system (OS) usually issues a "report luns" command to query how many logical units are available in a small computer system interface (SCSI) target device. The "report luns" command does not give any specific details of a LUN. The "inquiry" command yields specific details of a logical unit number (LUN). An "inquiry" command is for a specific logical unit number (LUN). An exemplary embodiment provides that the redundant dual active controller will only report to the small computer system interface (SCSI) clients LUNS in the storage array whose preferred controller is the controller receiving the command.

By using this particular controller configuration, host applications will lose the high availability feature in the storage array but gain several benefits. For example, system boot time will be reduced because the data paths from the un-owned controller will not be reported to the host operating system (OS). If a vendor specific multiple-path solution is not installed in the I/O driver stack of the host operating system (OS), booting a system up in some operating system (OS) platforms may take hours. The I/O subsystem of an operating system (OS) usually is abstracted into different layers. The abstracted group of layers is usually referred to as an I/O driver stack or I/O stack. A multiple-path driver could insert a driver module between the host bus adapter (HBA) driver layer and the small computer system interface (SCSI) server layer in the I/O driver stack. The driver module integrates all data paths to a data volume in a storage array and provides a virtual data path to the disk driver. In this way, the disk driver layer and the layers above the disk driver layer see only the virtual data path. The multi-path driver accepts I/O requests from the upper layers and distributes the I/O requests to different data paths.

Additionally, boot time volume thrashing may be avoided if implicit asymmetrical logical unit access mode is used and a vendor specific multiple-path solution is not installed in the I/O driver stack of the host operating system (OS). If a storage array is configured in this mode, a read/write I/O request to an alternate controller, which is a controller that is not currently the owner of the current volume, will trigger an action to move the ownership of the volume to the alternate controller. When all data paths to a volume are available to the operating system (OS) without a suitable multi-path driver, some I/Os for a data volume are addressed to one controller and some I/O requests for the same volume are addressed to the other controller during boot time. As a result, the ownership of the data volume will move around. Volume ownership change is a serious operation that slows down data-transfer between the host and the storage array.

Boot time I/O errors may be avoided if the explicit asymmetrical logical unit access mode is used and a vendor specific multiple-path solution is not installed in the I/O driver stack of the host operating system (OS). The terms "implicit asymmetrical logical unit access" and "explicit asymmetrical unit access" refer to the terms as specified in small computer system interface (SCSI) standard, SPC-4. Run-time volume thrashing may be avoided if a generic multiple path solution is used. A generic multiple path solution is a multiple path driver provided by an operating system (OS) vendor or third party software solution provider. A generic multiple path solution does not understand asymmetric logical unit access. Generic multiple path solutions consider all data paths to a volume to be optimal. A round-robin load-balance method is usually used to dispatch I/O requests in a round-robin fashion to all available data paths. Since one set of the data paths are connected to a non-owning controller, volume thrashing occurs. When this happens, the data transfer rate will be degraded to an unacceptable level. Making the redundant dual active controllers appear as two individual storage target devices allows for seamlessly fitting generic multiple-path/load balance solutions provided by operating system (OS) vendors or third parties.

Exemplary embodiments also allow the use of generic multiple-path/load balance solutions that comes with an operating system (OS) to avoid configuration issues and vendor-specific failover driver installation/configuration issues. As exemplary embodiments provide that the operating system (OS) recognizes only active-optimal data paths, the passive paths from an alternate non-owning controller are not recognized by the operating system (OS), thus avoiding problems. Furthermore, a generic multiple path driver is designed to work with active-optimal multiple-path devices. Therefore, as exemplary embodiments provide that the operating system (OS) recognizes only active-optimal data paths; exemplary embodiments will satisfy generic multiple-path solutions. Also, exemplary embodiments avoid issues of operating system (OS) vendor support and operating system (OS) warranty violation that occur when a non-vendor specific failover driver is installed.

Figure 3:
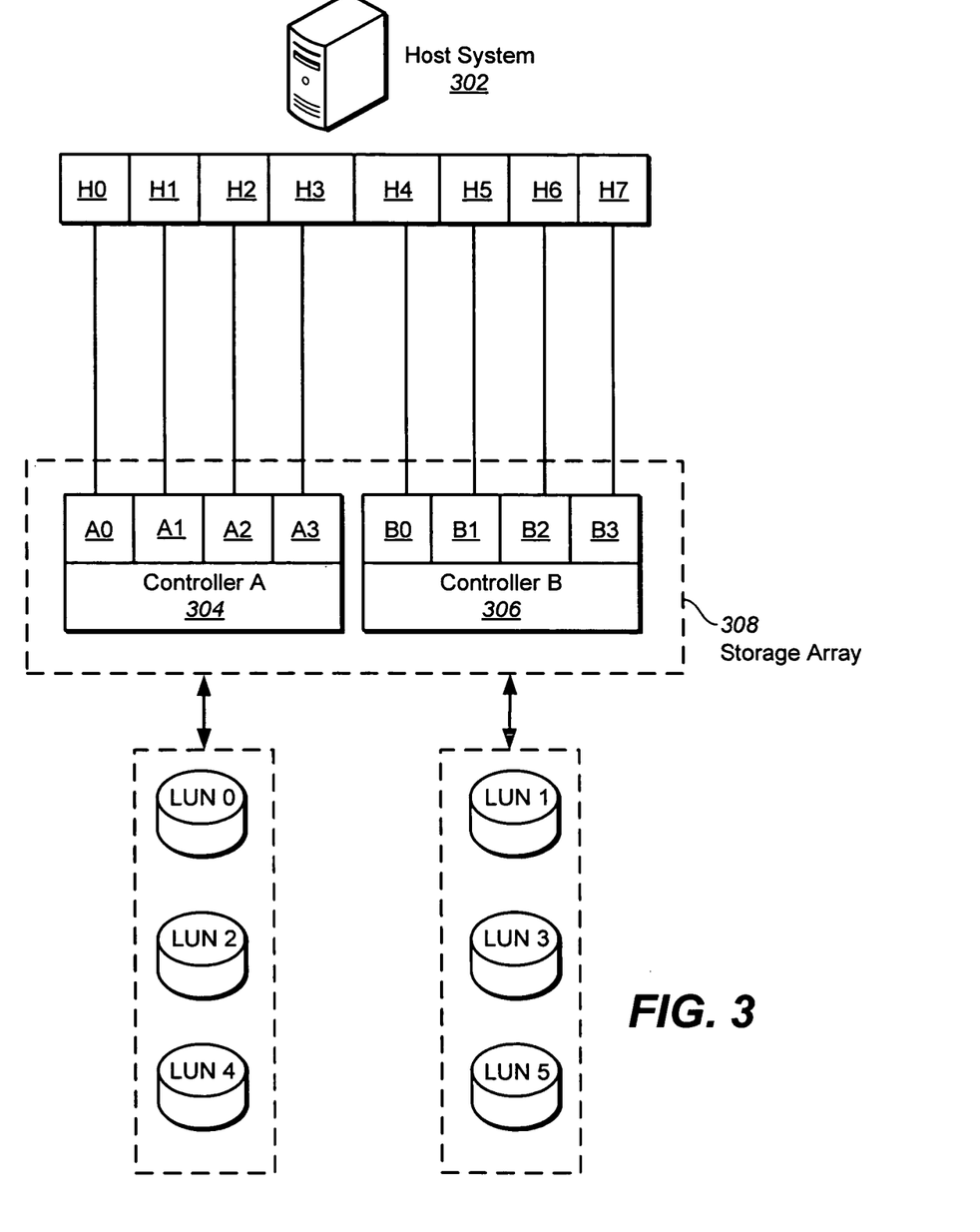
FIG. 3 is a block diagram of a system with redundant dual active controllers in accordance with an illustrative embodiment.

Turning back to the figures, FIG. 3 is a block diagram of a system with redundant dual active controllers in accordance with an illustrative embodiment. Host system 302 has multiple I/O paths connecting to storage array 308. Host system 302 may be implemented as a data processing system, such as data processing system 200 in FIG. 2. Storage array 308 comprises controller A 304 and controller B 306. Host system 302 has eight (8) host initiator ports, H0-H7. Controller A 304 has four (4) storage array target ports A0-A3. Controller B 306 has four (4) storage array target ports B0-B3. LUN 0, LUN 2, and LUN 4 are storage devices with controller A 304 as a preferred controller. LUN 1, LUN 3, and LUN 5 are storage devices with controller B 306 as a preferred controller. There are eight (8) data paths between host system 302 and storage array 308. The data paths are: H0-A0, H1-A1, H2-A2, H3-A3, H4-B0, H5-B1, H6-B2 and H7-B3. Under prior art solutions, host system 302 would see all eight data paths whenever host system 302 communicated with controller A 304 or controller B 306.

In an exemplary embodiment, host system 302 only sees the optimized data paths when host system 302 communicates with either controller A 304 or controller B 306. Optimized data paths are the data paths belonging to a preferred controller. Thus, when host system 302 communicates with controller A 304, host system 302 only sees data paths H0-A0, H1-A1, H2-A2, H3-A3. Likewise, when host system 302 communicates with controller B 306, host system 302 only sees data paths H4-B0, H5-B1, H6-B2 and H7-B3. For some storage array systems, data access to one group of the data paths are optimized and the I/Os to the other group of data paths will cause I/O performance penalties. In this case, some host applications will use only the data paths in the optimized group to ensure I/O performance. Those applications are willing to sacrifice the high availability feature that may be provided by a host controller-failover mechanism in the host operating system (OS) when data access to one of the dual controllers becomes unavailable.

In the example system depicted in FIG. 3, the optimized path groups are:

| Volume | Optimized path group |
| --- | --- |
| LUN 0 | H0-A0, H1-A1, H2-A2, H3-A3 |
| LUN 1 | H4-B0, H5-B1, H6-B2, H7-B3 |
| LUN 2 | H0-A0, H1-A1, H2-A2, H3-A3 |
| LUN 3 | H4-B0, H5-B1, H6-B2, H7-B3 |
| LUN 4 | H0-A0, H1-A1, H2-A2, H3-A3 |
| LUN 5 | H4-B0, H5-B1, H6-B2, H7-B3 |

Since a storage controller reports only the volumes whose preferred controller is the controller, the operating system (OS) will only discover the volume data paths from the preferred controller of the volume. Consequently, the redundant dual active controller will be presented to a host operating system (OS) as two independent small computer system interface (SCSI) target devices.

The multiple path I/O hardware configuration depicted in FIG. 3 applies to parallel small computer system interface (SCSI) transport, serial attached SCSI (SAS) transport, fiber channel transport, IfiniBand, and internet small computer systems interface (iSCSI) transport. Internet small computer systems interface (iSCSI) is a protocol that transports small computer system interface (SCSI) protocol over transmission control protocol (TCP). The internet small computer systems interface (iSCSI) protocol encapsulates small computer system interface (SCSI) command inside a TCP data frame.

Figure 4:
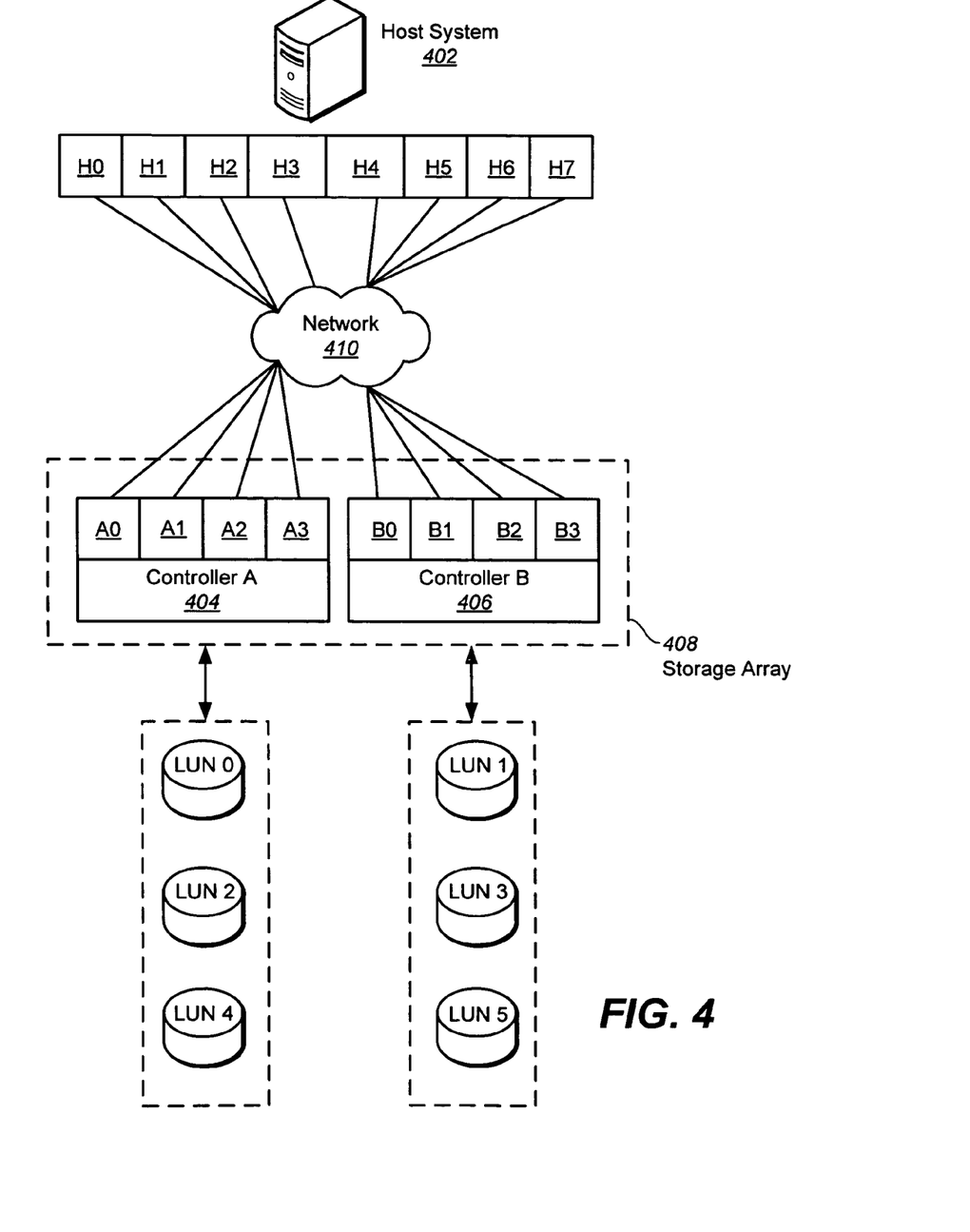
FIG. 4 is a block diagram of an alternate system with redundant dual active controllers in accordance with an illustrative embodiment.

FIG. 4 is an alternative way to illustrate the hardware configuration shown in FIG. 3. FIG. 4 is a block diagram of an alternate system with redundant dual active controllers in accordance with an exemplary embodiment. Host system 402 has multiple I/O paths connecting to storage array 408. Host system 402 may be implemented as a data processing system, such as data processing system 200 in FIG. 2. Storage array 408 comprises controller A 404 and controller B 406. Host system 402 has eight (8) host initiator ports, H0-H7. Controller A 404 has four (4) storage array target ports A0-A3.

Controller B 406 has four (4) storage array target ports B0-B3. LUN 0, LUN 2, and LUN 4 are storage devices with controller A 404 as a preferred controller. LUN 1, LUN 3, and LUN 5 are storage devices with controller B 406 as a preferred controller. The host initiator ports send commands to network 410. Network 410, known as a storage area network (SAN), may be either a fiber channel network, InfiniBand network, SAS with expendors, internet small computer systems interface (iSCSI) transport, or an internet protocol (IP) network. Expendors are a kind of switch. Network 410 then forwards these commands onto the controller A 404 and controller B 406. The number of data paths between host system 402 and storage array 408 is dependent on how network 410 is configured. If network 410 is not zoned, host system 402 may recognize as many as sixty-four (64) data paths in a hardware configuration such as the hardware configuration illustrated in FIG. 4. The reason host system 402 recognizes sixty-four data paths is that each one of the eight (8) initiator port can connect to each of the eight (8) target ports. As each initiator port to target port connection is a data path, the result is sixty-four (64) data paths. Zoning is a configuration method that separates initiator ports and target ports in a certain way.

Figure 5:
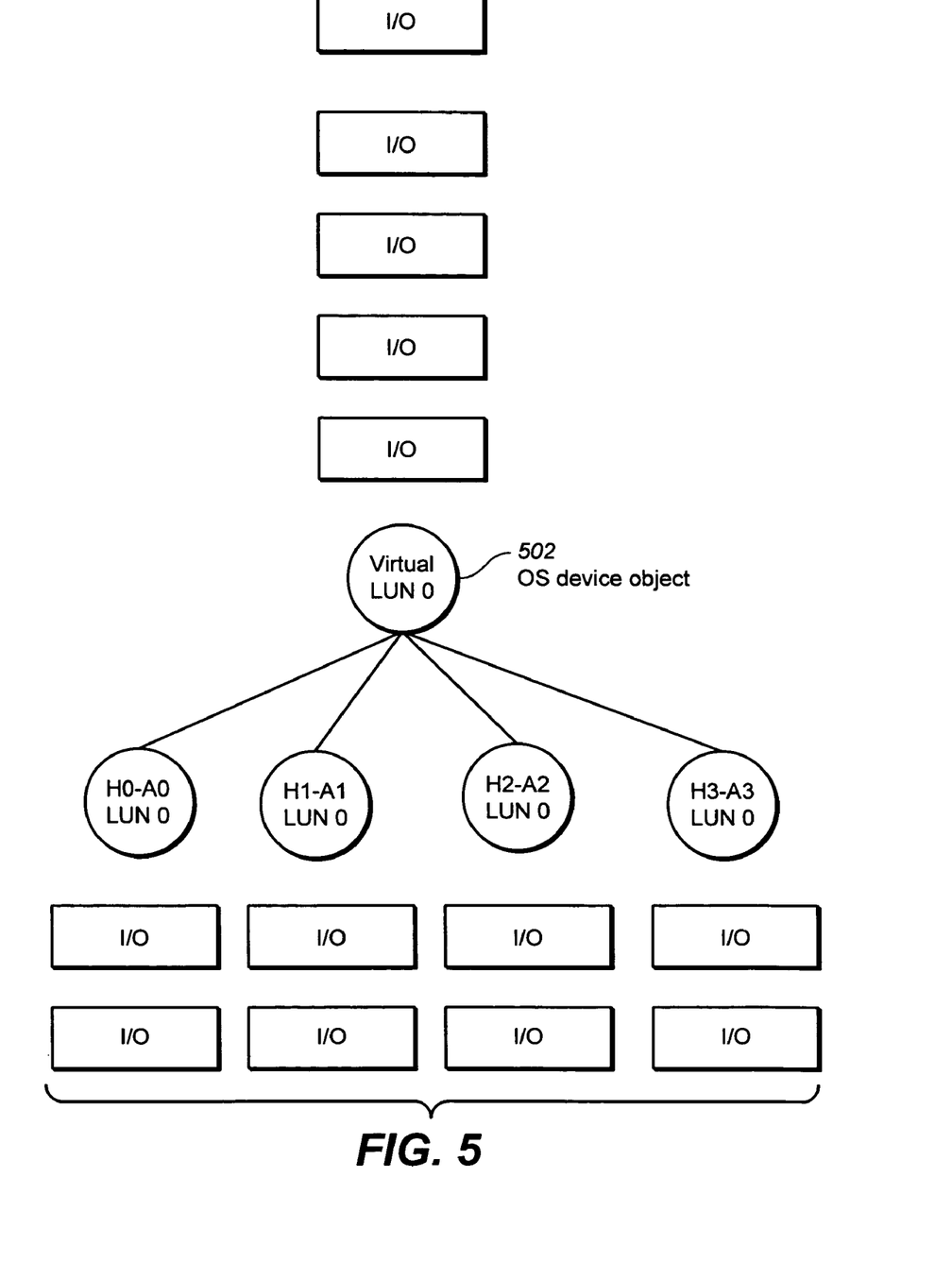
FIG. 5 is a block diagram of a system with virtual redundant dual active controllers in accordance with an illustrative embodiment.

FIG. 5 is a block diagram of a system with virtual redundant dual active controllers in accordance with an exemplary embodiment. Many modern operating systems (OSs) have built-in multiple path I/O (MPIO) features such as MPIO for Microsoft Windows 2003, AIX MPIO, Solaris MPxIO, Linux device-mapper, and HP-UX logical volume manager's multiple-path I/O feature. The MPIO implementation in each operating system (OS) platform may be different but the concept is similar. The implementation will present a virtual device access point for host applications. In FIG. 5, the virtual device access point is virtual LUN 0, shown as OS device object 502.

Virtual LUN 0 is an operating system object that represents the LUN 0 on the storage array through multiple-data path objects. The present example only depicts one operating system (OS) device object 502, the virtual LUN 0 that represents the optimized data paths for LUN 0, that is, H0-A0 LUN 0, H1-A1 LUN 0, H2-A2 LUN 0, and H3-A3 LUN 0. However, if the entire system depicted in FIG. 3 were shown in FIG. 5, six OS device objects, such as OS device object 502, would be shown. Each of the six OS device objects would represent optimized data paths for each of the six LUNs, LUN 0-LUN 5, respectively. However, for simplicity, FIG. 5 only depicts one OS device object, virtual LUN 0 502, that represents the optimized data paths for LUN 0. The I/O requests from host applications will come to the virtual access point, such as virtual LUN 0 502, and then be routed to available data paths. Applications queue their I/O requests (read or write) to virtual devices. In FIG. 5, an application has queued thirteen (13) I/O requests to virtual devices. These I/O requests are represented by I/O boxes. As shown, five (5) of the I/O requests have not been dispatched to the storage devices and eight (8) of the I/O requests have already been dispatched to LUN 0 on the storage array. With the eight (8) dispatched I/O requests, the multiple path I/O (MPIO) driver evenly distributes the eight (8) I/O requests to the four (4) data paths—H0-A0 LUN 0, H1-A1 LUN 0, H2-A2 LUN 0, H3-A3 LUN 0.

Figure 6:
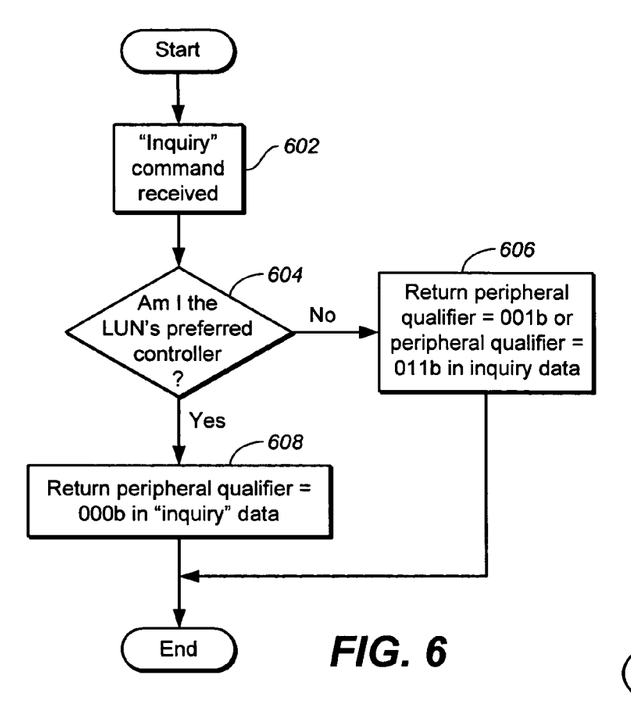
FIG. 6 is a flowchart illustrating the operation of a storage controller processing the "inquiry" small computer system interface (SCSI) command, in accordance with an illustrative embodiment.

FIG. 6 is a flowchart illustrating the operation of a storage controller processing the "inquiry" small computer system interface (SCSI) command, in accordance with a preferred embodiment. The operation of FIG. 6 may be implemented by a storage controller, such as storage controller A 304 in FIG. 3. The operation begins when a small computer system interface (SCSI) "inquiry" command regarding a specific logical unit number (LUN) is received by a controller (step 602). The controller then makes the determination if the controller is the preferred controller of the logical unit number (LUN) in the "inquiry" command (step 604). If the controller determines that the controller is the preferred controller of the logical unit number (LUN) in the "inquiry" command (a 'yes' output to step 604), then the controller returns a peripheral qualifier equal to 000b in inquiry data (step 608) and the operation ends. If the controller determines that the controller is not the preferred controller of the logical unit number (LUN) in the "inquiry" command (a 'no' output to step 604), then the controller returns a peripheral qualifier equal to either 001b or 011b in inquiry data (step 606) and the operation ends.

A storage array controller will report to a small computer system interface (SCSI) client device, the host operating system (OS), with peripheral qualifier equal to 000b in the inquiry data for LUNs whose preferred controller is the controller being queried.

Otherwise, the storage array controller will report peripheral qualifier 001b or 011b to prevent the host system from discovering LUNs whose preferred controller is not the queried controller. The non-zero value of the peripheral qualifier in an inquiry data will cause the host operating system (OS) to consider that the logical device is not available in the small computer system interface (SCSI) target device. For example, for the data path H0-A0 in FIG. 3, controller A 304 will report 000b for LUNs 0, 2, and 4 and 001b or 011b for LUNs 1, 3, and 5.

Figure 7:
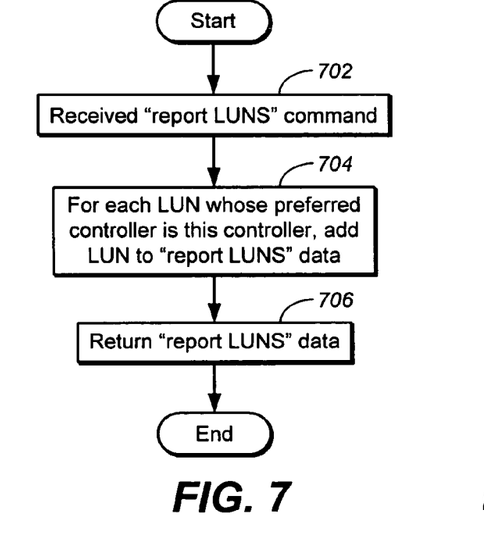
FIG. 7 is a flowchart illustrating the operation of a storage controller processing the "report luns" small computer system interface (SCSI) command, in accordance with an illustrative embodiment.

FIG. 7 is a flowchart illustrating the operation of a storage controller processing the "report luns" small computer system interface (SCSI) command, in accordance with a preferred embodiment. The operation of FIG. 7 may be implemented by a storage controller, such as storage controller A 304 in FIG. 3. The operation begins when a small computer system interface (SCSI) "report luns" command is received by a controller (step 702). For each logical unit number (LUN) whose preferred controller is the controller being queried, add the logical unit number (LUN) to the "report luns" data (step 704). Next the storage controller returns the "report luns" data (step 706) and the operation ends. Using the hardware configurations in FIG. 3 as an example, the "report luns" parameter data for the I_T nexus of H4-B0 will contain LUNs 1, 3, and 5. An I_T nexus is the link between an initiator port (I) and a target port (T).

When a modem host operation system performs small computer system interface (SCSI) disk discovery, the host operating system (OS) usually issues a "report luns" command first. Then, for each available LUNs in the "report luns" parameter data returned by the target device, the host operating system (OS) issues an "inquiry" command to obtain specific information regarding a logical unit. A nexus is a relationship among the various entities participating in an I/O process. The nexus begins with the establishment of an initial I/O connection and ends with the completion of the I/O process. A nexus between a SCSI initiator port, a SCSI target port, and a logical unit is called an I_T_L nexus. For each valid I_T_L nexus, the operating system (OS) will create an operating system (OS) specific object to represent the I_T_L nexus. This process is illustrated in FIG. 8.

Figure 8:
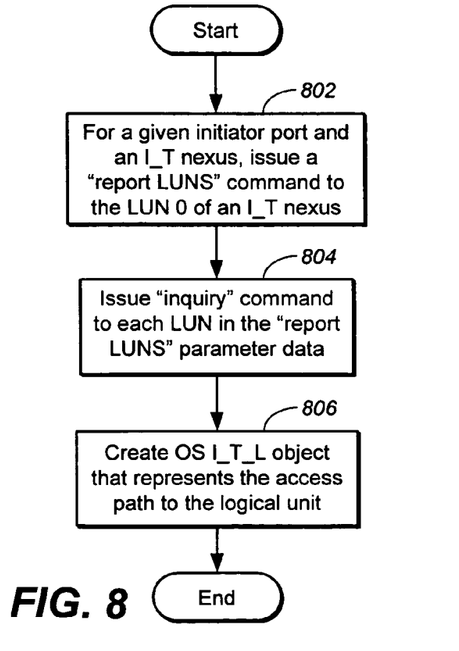
FIG. 8 is a flowchart illustrating the operation of a host operating system (OS) performing small computer system interface (SCSI) disk discovery, in accordance with an illustrative embodiment.

FIG. 8 is a flowchart illustrating the operation of a host operating system (OS) performing small computer system interface (SCSI) disk discovery, in accordance with a preferred embodiment. The operation of FIG. 8 may be implemented by a host system, such as host system 302 in FIG. 3. The operation begins when, for a given initiator port and an I_T nexus, a host system issues a small computer system interface (SCSI) "report luns" command to the LUN 0 of the I_T nexus (step 802). Next, the host operating system (OS) issues a small computer system interface (SCSI) "inquiry" command to each logical unit number (LUN) in the returned "report luns" parameter data (step 804). Then the host operating system (OS) creates an operating system (OS) I_T_L object that represents the access path to the logical unit (step 806) and the operation ends. An I_T_L object is an operating system kernel object that represents the I_T_L nexus representing a data path from which the operating system (OS) can talk to a LUN in the storage array.

If a host operating system (OS) doesn't support small computer system interface (SCSI) 3 standard, the host operating system (OS) usually sequentially scans logical units for a given I_T nexus up to a pre-configured maximum logical unit number. If the value of the peripheral qualifier in a returned inquiry data is not 000b, the operating system (OS) small computer system interface (SCSI) device discovery operation will skip the logical unit number without creating an operating system (OS) specific device object, as illustrated in FIG. 9.

Figure 9:
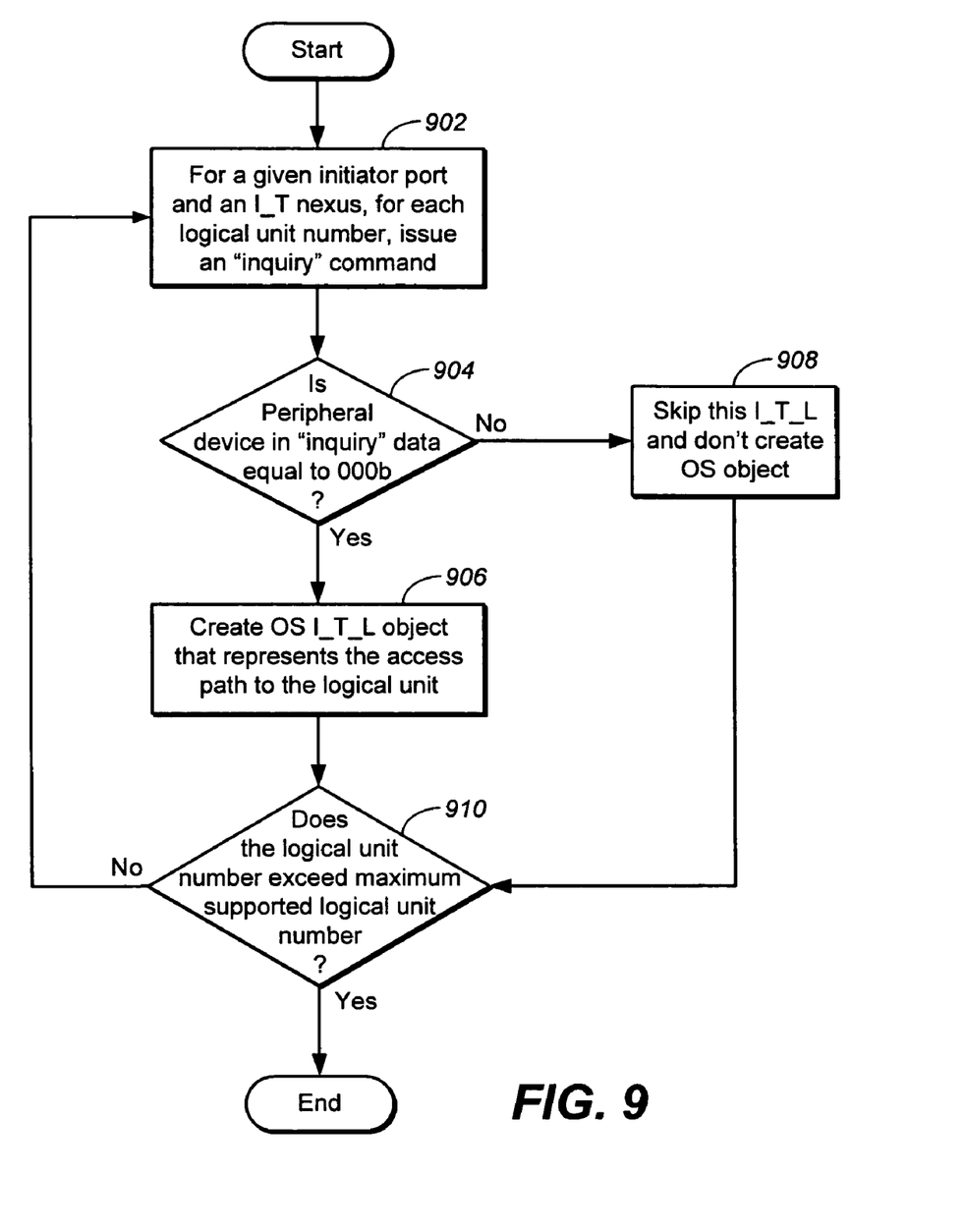
FIG. 9 is a flowchart illustrating the operation of a host operating system (OS) sequentially performing small computer system interface (SCSI) device discovery, in accordance with an illustrative embodiment.

FIG. 9 is a flowchart illustrating the operation of a host operating system (OS) sequentially performing small computer system interface (SCSI) device discovery, in accordance with a preferred embodiment. The operation of FIG. 9 may be implemented by a host system, such as host system 302 in FIG. 3. The operation begins when, for a given initiator port and an I_T nexus, for each logical unit number, a host system issues a small computer system interface (SCSI) "inquiry" command (step 902). Then the host operating system (OS) determines if the peripheral device in "inquiry" data is equal to 000b (step 904). If the host operating system determines that the peripheral device in "inquiry" data is equal to 000b (a 'yes' output to step 904), the host operating system (OS) creates an operating system (OS) I_T_L object that represents the access path to the logical unit (step 906) and the operation proceeds to step 910. If the host operating system (OS) determines that the peripheral device in "inquiry" data is not equal to 000b (a 'no' output to step 904), the host operating system (OS) skips this particular I_T_L and does not create an operating system (OS) object (step 908). Next, the operation determines if the logical unit number exceeds the maximum supported logical unit number (step 910). If the operation determines that the logical unit number does not exceed the maximum supported logical unit number (a 'no' output to step 910), the operation returns to step 902 to perform steps 902-910 for the next logical unit number. If the operation determines that the logical unit number does exceed the maximum supported logical unit number (a 'yes' output to step 910), then the operation ends.

It should be noted that in the case of a storage array with redundant dual active controllers that supports internet small computer systems interface (iSCSI) transport, special considerations are applied. Each controller in the redundant dual active controller should have a unique internet small computer systems interface (iSCSI) target device name. This will prevent an internet small computer systems interface (iSCSI) initiator or operating system (OS) internet small computer systems interface (iSCSI) driver from correlating small computer system interface (SCSI) devices from each controller in the redundant dual active controller. Each controller may report one target portal group tag for each target network portal or the controller may report one target portal group tag for all network portals in the controller. To prevent an internet small computer systems interface (iSCSI) initiator from knowing the network portals of the other controller in the redundant dual active controller, the sendTarget command should only report the network portals of the controller where the sendTarget command is processed. The sendTarget command is an internet small computer systems interface (iSCSI) command issued from an initiator that asks a target to report the information of the target.

Thus, an exemplary embodiment provides for a redundant dual active controller array that will appear to the host system as two independent storage targets. Each storage entity will manage host I/O requests to a set of volumes in the storage array. The host system will only realize the existence of the data paths from the preferred controller of a data volume. An exemplary embodiment provides that an operating system (OS) built-in multiple-path solution may freely distribute I/O requests to all available data paths of a data volume without causing I/O performance penalties since only optimized data paths are available to an operating system (OS).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system.

For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer implemented method for managing a dual active controller array that includes a first controller and a second controller, the computer implemented method comprising:
    receiving, by the first controller from an operating system, an inquiry that includes a specific logical unit number that identifies a particular one of a plurality of logical units;
    responsive to receiving the inquiry, determining, by the first controller, whether the first controller is a preferred controller for the particular one of the plurality of logical units;
    responsive to receipt of the inquiry and to the first controller determining that the first controller is the preferred controller for the particular one of the plurality of logical units: returning, by the first controller, a first peripheral qualifier to the operating system that indicates that the first controller is the preferred controller for the particular one of the plurality of logical units; and
    responsive to receipt of the inquiry and to the first controller determining that the first controller is not the preferred controller for the particular one of the plurality of logical units: returning, by the first controller, a second peripheral qualifier to the operating system that indicates that the second controller is not the preferred controller for the particular one of the plurality of logical units.

2. The computer implemented method of claim 1, further comprising:
    responsive to determining that the first controller is the preferred controller for the particular one of the plurality of logical units, returning an optimized data path, wherein an optimized data path is a data path between an initiator port of the first controller and a target port of the first controller.

3. The computer implemented method of claim 2, further comprising:
    receiving an input/output request for the particular one of the plurality of logical units, wherein the input/output request corresponds to the optimized data path; and
    transmitting the input/output request over the optimized data path.

4. The computer implemented method of claim 1, wherein the owned logical unit is a virtual logical unit.

5. The computer implemented method of claim 1, wherein the request is a small computer system interface inquiry command.

6. The computer implemented method of claim 1, wherein the request is a small computer system interface report luns command.

7. The computer implemented method of claim 1, wherein the request is received during a boot time.

8. The computer implemented method of claim 1, further comprising:
    wherein a data path exists between each one of a plurality of host ports included in a host computer system that is executing the operating system and at least one target port included in the first controller and between each one of the plurality of host ports and at least one target port included in the second controller;
    receiving, by the second controller from the operating system, the inquiry;
    responsive to receiving the inquiry, determining, by the second controller, whether the second controller is the preferred controller for the particular one of the plurality of logical units;
    responsive to the second controller determining that the second controller is the preferred controller for the particular one of the plurality of logical units, returning, by the second controller, the first peripheral qualifier that indicates that second controller is the preferred controller for the particular one of the plurality of logical units;
    responsive to the second controller determining that the second controller is not the preferred controller for the particular one of the plurality of logical units, returning the second peripheral qualifier that indicates that the second controller is not the preferred controller for the particular one of the plurality of logical units; and
    discovering, by the operating system, only data paths between the host computer system and the preferred controller.

9. A computer program product comprising a computer usable medium including computer usable code for managing a dual active controller array that includes a first controller and a second controller, the computer program product comprising:
- computer usable code for receiving, by the first controller from an operating system, an inquiry that includes a specific logical unit number that identifies a particular one of a plurality of logical units;
- computer usable code for, responsive to receiving the inquiry, determining, by the first controller, whether the first controller is a preferred controller for the particular one of the plurality of logical units;
- computer usable code for, responsive to receipt of the inquiry and to the first controller determining that the first controller is the preferred controller for the particular one of the plurality of logical units: returning, by the first controller, a first peripheral qualifier to the operating system that indicates that the first controller is the preferred controller for the particular one of the plurality of logical units; and
- responsive to receipt of the inquiry and to the first controller determining that the first controller is not the preferred controller for the particular one of the plurality of logical units: returning, by the first controller, a second peripheral qualifier to the operating system that indicates that the second controller is not the preferred controller for the particular one of the plurality of logical units.

10. The computer program product of claim 9, further comprising:
- computer usable code for, responsive to determining that the first controller is the preferred controller for the particular one of the plurality of logical units, returning an optimized data path, wherein an optimized data path is a data path between an initiator port of the first controller and a target port of the first controller.

11. The computer program product of claim 10, further comprising:
- computer usable code for receiving an input/output request for the particular one of the plurality of logical units, wherein the input/output request corresponds to the optimized data path; and
- computer usable code for transmitting the input/output request over the optimized data path.

12. The computer program product of claim 9, wherein the owned logical unit is a virtual logical unit.

13. The computer program product of claim 9, wherein the request is a small computer system interface inquiry command.

14. The computer program product of claim 9, wherein the request is a small computer system interface report luns command.

15. The computer program product of claim 9, wherein the request is received during a boot time.

16. The computer program product of claim 9, further comprising:
- wherein a data path exists between each one of a plurality of host ports included in a host computer system that is executing the operating system and at least one target port included in the first controller and between each one of the plurality of host ports and at least one target port included in the second controller;
- computer usable code for receiving, by the second controller from the operating system, the inquiry;
- responsive to receiving the inquiry, computer usable code for determining, by the second controller, whether the second controller is the preferred controller for the particular one of the plurality of logical units;
- responsive to the second controller determining that the second controller is the preferred controller for the particular one of the plurality of logical units, returning, by the second controller, the first peripheral qualifier that indicates that second controller is the preferred controller for the particular one of the plurality of logical units;
- responsive to the second controller determining that the second controller is not the preferred controller for the particular one of the plurality of logical units, computer usable code for returning the second peripheral qualifier that indicates that the second controller is not the preferred controller for the particular one of the plurality of logical units; and
- computer usable code for discovering, by the operating system, only data paths between the host computer system and the preferred controller.

17. A data processing system for managing a dual active controller array that includes a first controller and a second controller, the data processing system comprising:
- first receiving means for receiving, by the first controller from an operating system, an inquiry that includes a specific logical unit number that identifies a particular one of a plurality of logical units;
- determining means for, responsive to receiving the inquiry, determining, by the first controller, whether the first controller is a preferred controller for the particular one of the plurality of logical units;
- first returning means for, responsive to receipt of the inquiry and to the first controller determining that the first controller is the preferred controller for the particular one of the plurality of logical units: returning, by the first controller, a first peripheral qualifier to the operating system that indicates that the first controller is the preferred controller for the particular one of the plurality of logical units; and
- responsive to receipt of the inquiry and to the first controller determining that the first controller is not the preferred controller for the particular one of the plurality of logical units: returning, by the first controller, a second peripheral qualifier to the operating system that indicates that the second controller is not the preferred controller for the particular one of the plurality of logical units.

18. The data processing system of claim 17, further comprising:
- second returning means responsive to determining that the first controller is the preferred controller for the particular one of the plurality of logical units, returning an optimized data path, wherein an optimized data path is a data path between an initiator port of the first controller and a target port of the particular one of the plurality of logical units.

19. The data processing system of claim 18, further comprising:
- second receiving means for receiving an input/output request for the particular one of the plurality of logical units, wherein the input/output request corresponds to the optimized data path; and
- transmitting means for transmitting the input/output request over the optimized data path.

20. The data processing system of claim 17, wherein the owned logical unit is a virtual logical unit.

* * * * *